(No Model.)
T. B. MARSHALL.
BICYCLE SUPPORT.
No. 478,878. Patented July 12, 1892.
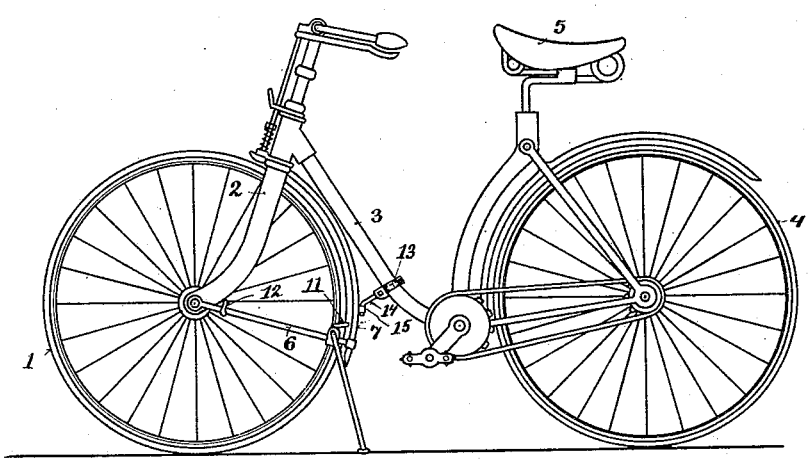
Fig. 1.
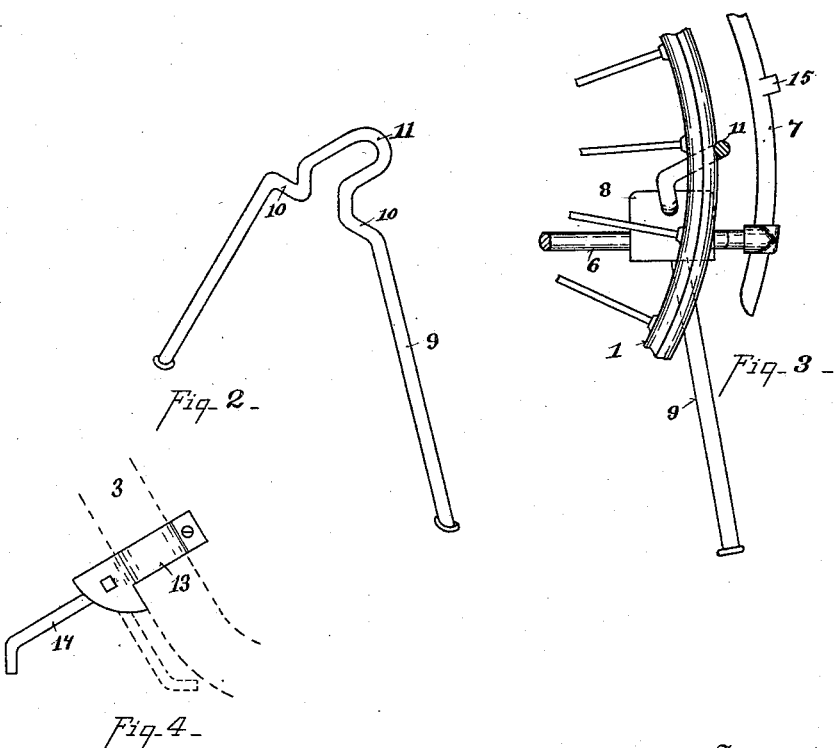
Fig. 2.
Fig. 3.
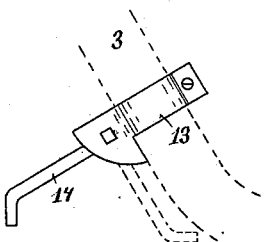
Fig. 4.
Witnesses
C. W. Miles
T. Simmons
Inventor
Thomas B. Marshall
By his Attorneys Wood & Boyd
THE NORRIS PETERS CO., PHOTO-LITHO., WASHINGTON, D. C.

UNITED STATES PATENT OFFICE.

THOMAS B. MARSHALL, OF SIDNEY, OHIO.

BICYCLE-SUPPORT.

SPECIFICATION forming part of Letters Patent No. 478,878, dated July 12, 1892.

Application filed September 16, 1891. Serial No. 405,900. (No model.)

*To all whom it may concern:*

Be it known that I, THOMAS B. MARSHALL, a citizen of the United States, and a resident of Sidney, in the county of Shelby and State of Ohio, have invented certain new and useful Improvements in Bicycle Brakes and Supports, of which the following is a specification.

The object of my invention is to provide a suitable support for a bicycle to hold it in an upright position and at the same time act as a brake to prevent the wheel thus supported from turning.

Another object of my invention is to provide an attachment to prevent the pilot-wheel from turning sidewise.

The various features of my invention will be fully set forth in the description of the accompanying drawings, making a part of this specification, in which—

Figure 1 is a side elevation of my improvement attached to a bicycle. Fig. 2 is a perspective view of the support and brake. Fig. 3 is an enlarged sectional elevation. Fig. 4 is a sectional elevation of the locking device.

1 represents a pilot-wheel of an ordinary bicycle; 2, the fork; 3, the backbone; 4, the rear wheel, and 5 the seat.

6 represents the braces which support the mud-guard 7.

8 represents journal-plates, preferably supported on the braces near the mud-guard; but they may be engaged with the mud-guard.

9 represents a combined support and brake. The lateral journals 10 have bearings in the plates 8, and the crank-bend 11 passes round in rear of the wheel. This brace swings up out of the way and attaches to hooks 12 on front of the braces when it is not in use. When it is desired to support the bicycle, it is turned down with the feet resting upon the ground and the crank-bend 11 engaging the periphery of the pilot-wheel, which acts as a brake to prevent it from moving forward or backward, and the fork-support 9 holds the bicycle in an upright position, making at once a light, effective, and convenient bicycle-support.

In case a bicycle does not contain a brake I have provided a locking device 13, which is adjustable on the backbone 3. It is provided with the pivoted hook 14, adapted to be swung outward for engagement with the lug 15 on the mud-guard 7, so as to lock the pilot-wheel and the backbone and prevent the pilot-wheel and mud-guard from turning sidewise.

The bicycle-support 9 may be used independently of the locking device, and vice versa.

Having described my invention, what I claim is—

1. The combination, with the pilot-wheel and the mud-guard of a bicycle, of a support composed of a pair of arms 9, having lateral journals 10, formed with the crank-bend 11, extending at opposite sides of the tire and engaging the periphery thereof when the pair of arms is swung rearward to rest upon the ground, substantially as described.

2. The combination, with the pilot-wheel and the mud-guard of a bicycle, of the braces 6, connecting the pilot-wheel axle with the mud-guard and provided with the plates 8, and a support composed of a pair of arms 9, having lateral journals 10 arranged in the plates on the braces and formed with the crank-bend 11, which extends at opposite sides of the tire and engages the periphery thereof when the pair of arms is swung rearward, substantially as described.

3. The combination, with the pilot-wheel 1, the fork 2, the mud-guard 7, secured to the fork and provided with a lug 15, and the backbone 3, of the locking device 13, carried by the backbone and provided with a pivoted hook 14, adapted to be swung outward for engagement with the lug on the mud-guard, substantially as and for the purposes described.

In testimony whereof I have hereunto set my hand.

THOMAS B. MARSHALL.

Witnesses:
J. M. LEIDIGH,
WM. HASLUP.